United States Patent
Lu et al.

(10) Patent No.: US 9,137,839 B2
(45) Date of Patent: Sep. 15, 2015

(54) CONTROL DOMAIN CHANGE BASED ON NETWORK REGISTRATION CONDITION

(75) Inventors: Min Lu, Freehold, NJ (US); Walter Cooper Chastain, Atlanta, GA (US); Martin Dolly, Forked River, NJ (US); Judith Espejo, Snellville, GA (US); Mario Jardon, Pembroke Pines, FL (US); Russell Sharples, East Windsor, NJ (US); Guang Wang, Redmond, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 676 days.

(21) Appl. No.: 12/858,361

(22) Filed: Aug. 17, 2010

(65) Prior Publication Data

US 2012/0044861 A1    Feb. 23, 2012

(51) Int. Cl.
*H04W 4/00* (2009.01)
*H04W 76/02* (2009.01)
*H04W 72/04* (2009.01)
*H04L 12/66* (2006.01)

(52) U.S. Cl.
CPC ........ *H04W 76/026* (2013.01); *H04W 72/0406* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 2002/0196775 A1* | 12/2002 | Tuohino et al. | 370/352 |
| 2005/0286531 A1* | 12/2005 | Tuohino et al. | 370/395.2 |
| 2006/0025129 A1* | 2/2006 | Wolfman et al. | 455/432.1 |
| 2007/0061397 A1* | 3/2007 | Gregorat et al. | 709/203 |
| 2007/0071221 A1* | 3/2007 | Allen et al. | 379/265.01 |
| 2007/0124438 A1* | 5/2007 | Park et al. | 709/223 |
| 2007/0238468 A1* | 10/2007 | Buckley et al. | 455/445 |
| 2010/0144351 A1 | 6/2010 | Witzel et al. | |

OTHER PUBLICATIONS

3GPP TS 23.221 V9.4.0 (Jun. 2010)—3rd Generation Partnership Project; Technical Specification Group Services and System Aspects; Architectural requirements (Release 9), Section 7.2.2: Calls directed to the CS domain. http://www.3gpp.org. Last accessed Nov. 18, 2010, 48 pages.

* cited by examiner

*Primary Examiner* — Kodzovi Acolatse
(74) *Attorney, Agent, or Firm* — Amin, Turocy & Watson, LLP

(57) ABSTRACT

Aspects describe a separate domain selection function that is utilized as the first function in a communication path for a communication that is to be connected to a user device registered in a first network or a second network. If a result of the domain selection function indicates call control should be maintained by first network (e.g., user device is registered with first network or a network with which first network has a control relationship), call control of the communication remains with first network. If the result of the domain selection function indicates the user device is registered with second network, call control is suspended by the first network, which allows the communication to bypass the first network.

15 Claims, 11 Drawing Sheets

CONTROL DOMAIN CHANGE BASED ON NETWORK REGISTRATION CONDITION

TECHNICAL FIELD

The subject disclosure relates to wireline or wireless communications and, more particularly, to terminating processing of communications.

BACKGROUND

A user device, which can be wireless or wireline, might be in an access network or domain in which the Gm interface (e.g., 3GPP TS 23.292), which provides direct communication to a home carrier's Internet Protocol Multimedia Subsystem (IMS) domain, is not available or is not desirable for use. In this situation, IMS-related call control might not be supported. Currently, in 3GPP ($3^{rd}$ Generation Partnership Project) specifications (e.g., TS 23.292), I1 and I2 ICS (IMS Centralized Services) reference points have been defined to solve this problem. However, the I1 implementation requires significant development on the user device (e.g., handset) and the I2 implementation requires significant investment in Mobile Switching Center (MSC) based technology. Further, neither the I1 solution nor the I2 solution is attractive considering the evolving nature of the problem. For example, as a Long Term Evolution (LTE) network expands, there will be fewer and fewer circumstances in which user devices are on access networks that do not provide direct communication to the IMS domain. The I2 method can also depend on a visited (serving) carrier's willingness to upgrade their MSCs.

The 3GPP specification (e.g., TS 23.292, Sec 5.3.1) has defined the IMS SCC-AS (Service Centralization and Continuity Application Server) to be the last network entity in the terminating iFC (initial Filter Criteria) chain of application servers. This design assumes that IMS control is desired for all calls. However, in some cases, it is desirable to use the non-IMS domain to perform voice call control. For example, when a user roams on a non-IMS foreign network that may not support the home carrier's advance services, it might be desirable to use the non-IMS domain for voice call control.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One or more aspects relate to the invocation of a separate domain selection function as the first Internet Protocol Multimedia Subsystem (IMS) application server in the initial filter criteria (iFC) to enable and/or disable IMS processing. The disclosed aspects provide a smart and economic solution that utilizes existing technology when IMS direct control is not available or is not desirable. Further, the disclosed aspects do not require significant development on the user device or on legacy circuit-switched core elements, such as a Mobile Switching Center (MSC). The disclosed aspects can be utilized by carriers that have mixed IMS network and legacy circuit-switched networks or any carrier that supports roaming. Further, the disclosed aspects can be applied to both wireline applications and wireless applications.

An aspect relates to a method for selecting a control domain. Method comprises receiving at a first network a communication for a user device, wherein the user device is located in the first network or in a second network. Method can also comprise enabling call control of the communication at the first network and performing a domain selection function as a first function in a communication path for the communication. Further, method can comprise selectively disabling call control at the first network based on a result of the domain selection function.

Another aspect relates to a communication apparatus comprising a receiver component that receives a communication intended for a user device. Communication apparatus also comprises a call control component that enables call control for the communication and a domain selection function component that performs domain selection for the communication. A result of the domain selection indicates whether the call control should be continued by the communication apparatus. The call control component selectively disables the call control of the communication apparatus based on the result of the domain selection.

A further aspect relates to a computer-readable storage medium comprising computer-executable code instructions stored therein, wherein in response to execution by at least one processor, the computer-executable code instructions performs a group of acts. The group of acts comprise enabling call control for a communication, wherein the communication is received at a home network and is to be connected to a user device located in the home network or in a visited network. The groups of acts also comprise performing a domain selection function as a first function in a communication path for the communication and selectively continuing call control for the communication as a function of a result of the domain selection function.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects of the disclosed subject matter are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
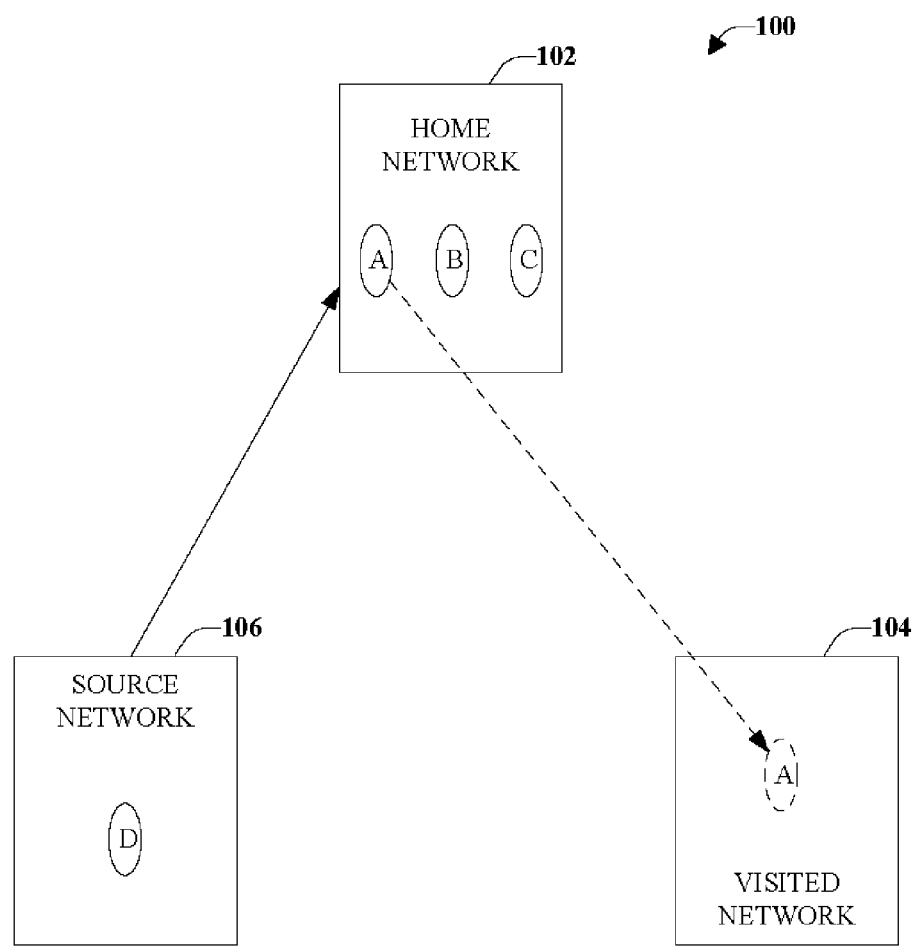
FIG. 1 illustrates an example communication system that provides subscriber intelligent telephony domain control selection, according to an aspect.

Referring to FIG. 1, illustrated is an example communication system 100 that provides subscriber intelligent telephony domain control selection, according to an aspect. Communication system 100 can include a first network 102 that is associated with a plurality of user devices, labeled as devices "A", "B", and "C". It should be noted that although only three user devices are illustrated, first network 102 can include any number of user devices. The user devices can be wireline devices or wireless devices. In accordance with some aspects, a user device can have multiple capabilities that allow the device to switch between wireline capabilities and wireless capabilities. According to an aspect, first network 102 can be a home network, which is the network that controls identifiers (e.g., a phone number, an IP address, and so forth) associated with the user devices.

One or more of the plurality of user devices can be moved away from the coverage area of first network 102. For example, as the owner of device "A" travels (e.g., visits another state or another country), device "A" can be moved from the first network 102 to a second network 104, which can be a remote or visited network in the different state or different county, as illustrated.

Also included in communication system 100 can be another network, such as a third network 106, from which a communication is originated (e.g., a source network), by a source device "D". However, in accordance with some aspects, the communication can originate by a device in first network 102 or a device in second network 104. The communication can be intended for a user device (e.g., terminating device) associated with first network (e.g., device "A", device "B", device "C") even though the device is currently located in a different network (e.g., second network 104). In accordance with some aspects, the communication is intended for a user device that is currently located in first network 102. Regardless of the location (e.g., first network 102, second network 104) of the terminating device (e.g., device on which completion of the connection between the party that originated the communication (e.g., source device) and the called party (e.g., terminating device) so that communication can proceed), the communication from device "D" will be initially routed to the first network 102 for processing. When the communication is received by the first network 102, call control of the communication is enabled by first network 102.

Call control can also be enabled by the terminating network (if the terminating network is not first network 102). First network 102 also performs a domain selection function as a first function in terminating processing of the communication. The domain selection function can ascertain whether call control should be retained by the first network 102 or whether call control should be suspended by first network 102. Suspension of call control by the first network 102 can allow second network 104 (e.g., terminating network) to perform call control for the communication. Further details related to the domain selection function and the decision to retain call control at first network 102 or to suspend call control at the first network 102 will be discussed below.

Figure 2:
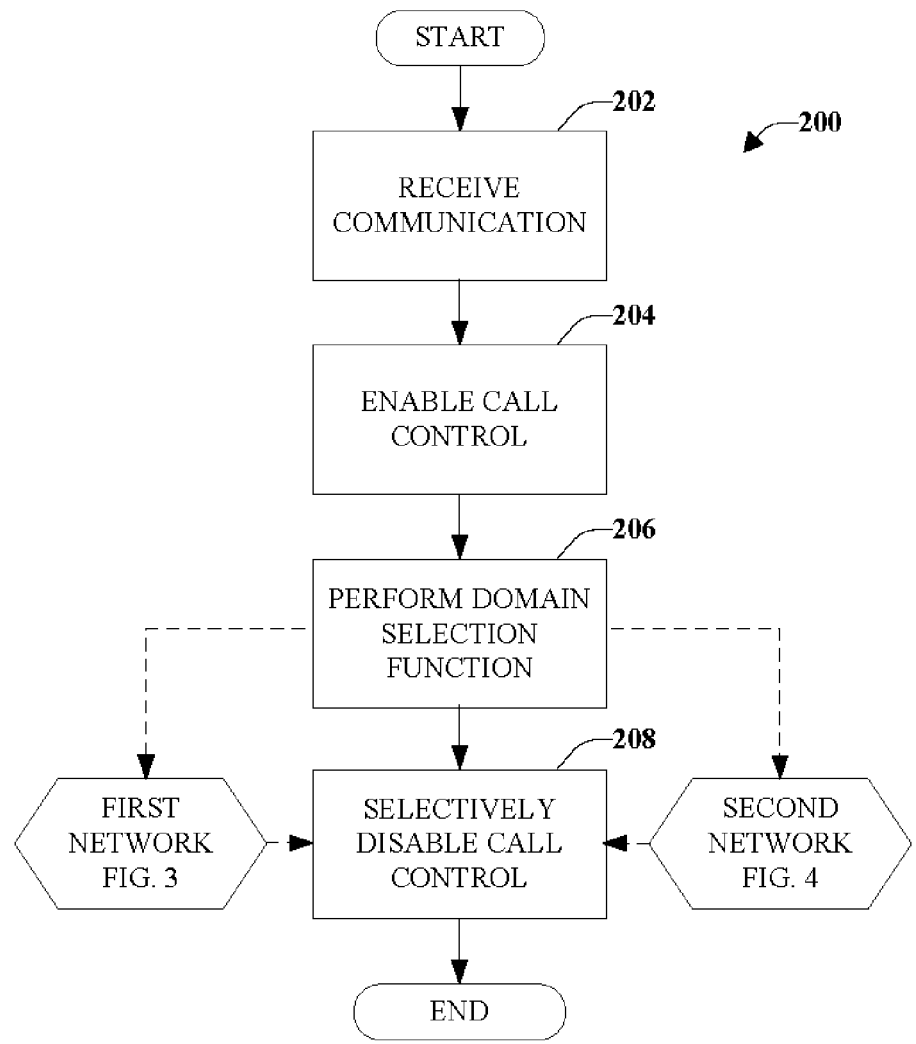
FIG. 2 illustrates a method for changing a control domain, according to an aspect.

FIG. 2 illustrates a method 200 for selecting a control domain, according to an aspect. The one or more disclosed aspects can be configured to provide a smart and economic solution that enables seamless call control when direct control by a network, such as a home network, is either not available or is not desirable. For example, at times Internet Protocol Multimedia Subsystem (IMS), which is an architectural framework for delivering Internet Protocol (IP) multimedia services, direct control might not be available and/or might not be desirable. Further, the disclosed aspects can be utilized without significant development (e.g., modifications, upgrades, and so forth) to a user device (e.g., user equipment) or to legacy circuit-switched core network elements. Legacy circuit-switched core network elements can include a Mobile Switching Center (MSC), which provides circuit-switched calling, mobility management, and Global System for Mobile Communications (GSM) services to devices that are roaming within the area served by a circuit-switched element, such as the MSC, for example.

Generally, circuit switching is the process of establishing a circuit (or channel) between nodes and terminals (e.g., user devices) before the communication can occur (such as if the nodes and terminals were physically connected, although they need not be physically connected). Packet switching is the process of segmenting a communication (e.g., voice, data, video, and so forth) into smaller packets for transmission. Packet switching and circuit switching are well known to those of skill in the art and so will not be further described here.

In view of the aspects described herein, methods that may be implemented in accordance with the disclosed subject matter will be better appreciated with reference to various flow charts and/or call flows. While, for purposes of simplicity of explanation, methods are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methods described herein. It is to be appreciated that functionality associated with blocks may be implemented by software, hardware, a combination thereof or any other suitable means (e.g. device, system, process, component). Additionally, it should be further appreciated that methods disclosed throughout this specification are capable of being stored on an article of manufacture to facilitate transporting and transferring such methods to various devices. Those skilled in the art will understand and appreciate that a method could alternatively be represented as a series of interrelated states or events, such as in a state diagram. In accordance with some aspects, a processor executing computer executable instructions stored on a computer readable storage medium is configured to implement the methods and/or call flows disclosed herein.

Method 200 starts, at 202, when a communication that is to be terminated (e.g., a call path between an originating device and the device to which the communication is directed is completed) at a user device is received at a first network. In accordance with some aspects, the communication is received over a Public Land Mobile Network (PLMN) or over an IMS network that provides originating telecommunications services or other network. The communication can be received at a node associated with the first network, such as an IMS core, which can be accessed from PLMN though a Media Gateway (MGW), for example. The communication could have originated in the first network, a second network, or another network. At 204, call control for the communication is enabled in the first network.

At 206, a domain selection function is performed by a network entity of the first network. In accordance with some aspects, the network entity is a Domain Selection Application Server (DS-AS), for example. The domain selection function can be the first function in a communication path for terminating processing to enable and/or disable terminating feature processing for the communication. In accordance with some aspects, the domain selection function is based on a network registration condition of the terminating device (e.g., in which network the terminating device currently registered). In accordance with some aspects, the terminating feature processing is IMS terminating feature processing.

The domain selection function, can include a determination whether a session associated with the communication (e.g., terminating processing) should be controlled by the first network. In an example, the determination can be whether the communication should be IMS-controlled or non-IMS-controlled (e.g., Circuit Switched, IP-based). In accordance with some aspects, the determination is made based on sending a query to a database and receiving service domain information and access domain information in response to the query. In accordance with some aspects, the determination is made based on one or more factors. For example, the determination can be made based on obtaining a location (e.g., in which network the device is currently located) of a user device on which the communication is terminated, such as by sending a query to a database to obtain network information related to a network to which the terminating device is currently connected (e.g., first network, second network, or other terminating network). In accordance with some aspects, the determination is based on access network capability of the network to which the terminating device is connected (e.g., 2G, 3G, LTE, packet switching capable or not, and so forth). In some aspects, the determination is made based on the terminating device capability (e.g., supports IMS or does not support IMS). According to some aspects, the determination is made based on the terminating device's profile/configuration. In some aspects, the determination is made as a function of internal provisioned information that is maintained by at least one network entity in the first network. The internal provisioned information can be maintained in a computer-readable storage medium. The internal provisioned information can include whether the terminating device is in a network that is a supported roaming partner of the first network, circuit-switched (e.g., MSC) information and so forth. In accordance with some aspects, the determination is made based on various combinations of the above. In accordance with some aspects, the determination can be made in other manners.

In accordance with some aspects, the domain selection function can be performed to establish that there is no existing control relationship between the first network and the second network (e.g., terminating network in which device is currently located). For example, the establishing comprises ascertaining that first network is IMS-controlled and second network is non-IMS-controlled. Lack of a control relationship can be established based on information contained in a database, look-up table, or other source that provides a correlation between home network and other networks to which home network has a relationship (e.g., HSS).

A result of the domain selection function is which control domain (e.g., first network, second network, IMS, non-IMS) is to be selected for a communication session. In accordance with some aspects, the result can indicate that a control domain of the first network should be selected for call control. According to some aspects, the result can indicate that the control domain of the second network should be utilized for call control.

Based in part on the result of the domain selection function, call control of the communication session by first network is selectively disabled, at 208. For example, if the result of the domain selection function indicates that call control of the communication should be performed by first network, call control by first network is continued (e.g., is not disabled). However, if the result of the domain selection function indicates that call control should be performed by second network (wherein the user device on which the communication is terminated is located in second network), call control is disabled in the first network. In accordance with some aspects, the selectively disabling comprises bypassing IMS feature control when first accessing an IMS domain, wherein the communication is non-IMS-controlled.

Figure 3:
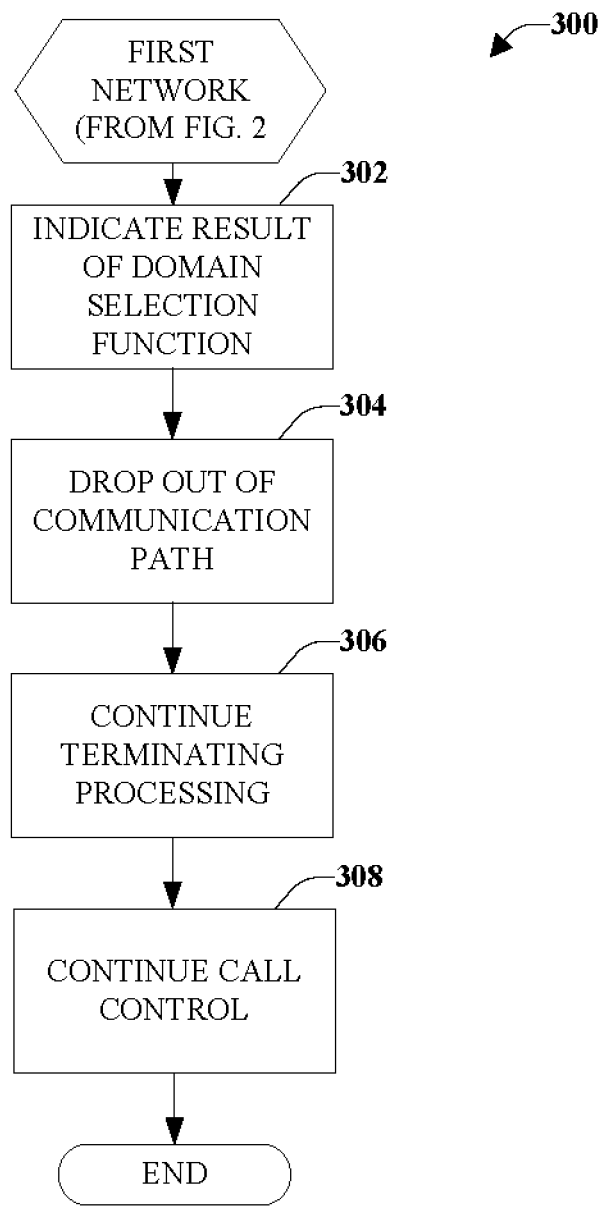
FIG. 3 illustrates a method for a communication that can be controlled in a first network, according to an aspect.

FIG. 3 illustrates a method 300 for a communication that can be controlled in a first network, according to an aspect. The first network can be, for example, a home network. First network can be a packet-switched network or a circuit-switched network. According to some aspects, first network is an IMS or voice network. In accordance with some aspects, the communication is to be controlled in the first network e.g., based on the domain selection function at 206 of FIG. 2. For control by the first network, method 300 discontinues the domain selection function (DSF) and indicates, at 302, the result of the domain selection function (e.g., domain selection function at 206) to another entity of the first network. For example, the domain selection function is performed by a DS-AS and the result of the determination is indicated to an entity located in the IMS Core, wherein the result is passed to downstream network elements to be used as needed. At 304 the network entity (e.g., DS-AS) selectively drops out of the communication path. In accordance with some aspects, dropping out of the communication path comprises transmitting session Internet Protocol messages from the network entity (e.g., DS-AS) to an entity in the first network (e.g., IMS core). The session Internet Protocol messages can indicate an intent by the network entity (e.g., DS-AS) to be removed from the communication path.

At 306, terminating processing is continued and, as indicated at 308, call control of the communication is continued to be processed by the first network. For example, an SCC-AS is accessed to anchor the communication. The SCC-AS can indicate to an entity in the IMS core, for example, to route the communication to the terminating user device through the appropriate access network and method (e.g., LTE, Gm, ICS Gm, PLMN, and so on).

According to some aspects, if the communication is IMS-controlled, SCC-AS will be accessed as the last Application Server in the initial filter criteria (iFC) chain. The anchor function in SCC-AS can be performed to prepare for future handover of the communication (e.g., to another network that has a control relationship with first network). In accordance with some aspects, an example high level iFC definition can be as follows:

INVITE: Terminating;
First invoke DS-AS function;
If the call is v-MSC controlled, skip the remaining iFC, directly route using Mobile Subscriber Roaming Number (MSRN);
If the call is IMS-controlled, invoke (Telephony Application Server (TAS) processing;
Last, invoke SCC-AS processing for call anchoring.

Figure 4:
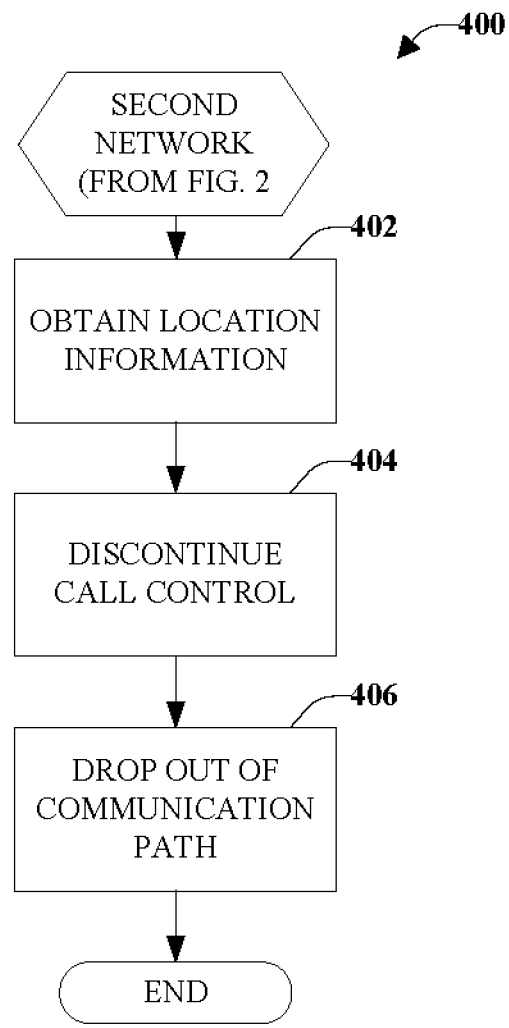
FIG. 4 illustrates a method for a communication that can be controlled in a second network, according to an aspect.

FIG. 4 illustrates a method 400 for a communication that can be controlled in a second network, according to an aspect. According to some aspects, the communication is to be controlled by a terminating network (e.g., not the home network) e.g., based on the determination made at 206 of FIG. 2. In this case, method 400 comprises obtaining a location of the terminating user device, at 402. For example, the location of the terminating device can include identifying the network in which the terminating device is registered when the communication is received. To obtain the location, a routing function can be performed. In an example, the location of the user device can be obtained when a Send Routing Information (SRI) query is performed to obtain a Mobile Subscriber Roaming Number (MSRN) of the roaming user device (e.g., second user device). In accordance with some aspects, the MSRN or other identifying information can be obtained in other manners.

At 404, the call control by the first network is discontinued in order to bypass the domain (e.g., IMS domain) of the first network. In an example, routing the communication comprises generating a Roaming Uniform Resource Identifier (R-URI) that includes MSRN information. The R-URI (and MSRN information) can be routed back to the first network. The first network can route the communication to the user device's vMSC (visited MSC) in the second network with no further IMS Application Server (AS) processing.

In accordance with some aspects, the network entity (e.g., DS-AS) can drop out of the communication path, at substantially the same time as the communication is routed to the location, at 406. For example, session Internet Protocol messages can be transmitted to an entity in the home network that indicates an intent (by DS-AS) to be removed from the communication path.

Figure 5:
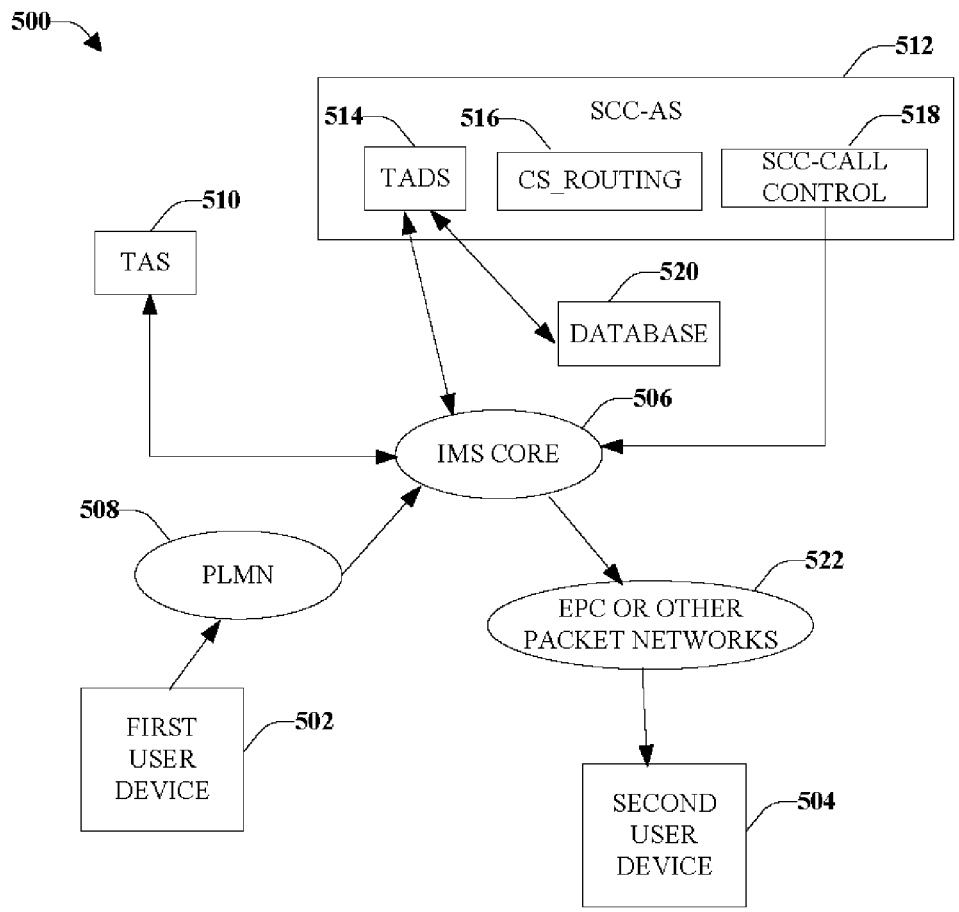
FIG. 5 illustrates a system for a traditional Long Term Evolution user device-termination call to an IMS-controlled domain.

So that the disclosed aspects may be more fully appreciated, various call systems for conventional terminating processing will now be discussed. Although these systems will be discussed with reference to an IMS-controlled domain and a non-IMS-controlled domain, the disclosed aspects are not limited to an IMS-controlled domain and a non-IMS-controlled domain. FIG. 5 illustrates a system 500 for a conventional Long Term Evolution termination call to an IMS-controlled domain. Included in call flow 500 are a first user device 502 and a second user device 504. First user device 502 initiates a communication (e.g., voice call, data call, and so forth) intended for second user device 504. Second user device 504 can be associated with a home network but can be located in home network or a visited network when the communication is to be terminated (e.g., when the communication is connected at the second user device). First user device 502 can be located in home network, visited network, or another network. The communication is routed from first user device 502 to an IMS Core 506 for terminating processing. In accordance with some aspects, the communication is routed through a public land mobile network (PLMN 508) or other network. The IMS core 506 utilizes initial filter criteria (iFC) to determine that the first application server should be a Telephony Application Server (TAS 510). The TAS 510 applies required terminating voice call features (e.g., Call Forwarding and so forth). After applying the required terminating voice call features, the TAS 510 sends the communication back to the IMS Core 506.

When the call is to be routed to the second user device 504, the IMS core 506 utilizes iFC to invoke a Service Centralization and Continuity Application Server (SCC-AS 512) as the last application server. Included in the SCC-AS 512 are a Terminating Access Domain Selection (TADS 514), a Circuit-Switching Routing component (CS_routing 516) and a SCC-call control component (SCC-call control 518).

The TADS 514 (or another SCC-AS 512 component) can query a database 520 that can contain subscription-related information (such as subscriber profiles), can perform authentication and authorization of the second user device 504, and can provide information related to the location of the second user device 504 (e.g., subscriber) and IP information. In accordance with some aspects, the database is a Home Subscriber Server (HSS), which is a master user database that supports IMS network entities.

The database 520 responds to the query request and the information in the response is combined with TADS 514 provisioned information to allow SCC-AS 512 to determine that the second user device 504 is connected to the LTE home network. The SCC-AS 512 provides call anchoring and sends the call back to the IMS core 506. The IMS core 506 routes the communication to the second user device 504. For example, the communication can be routed to the second user device 504 through EPC (Enhanced Packet Core) or other packet networks 522.

Figure 6:
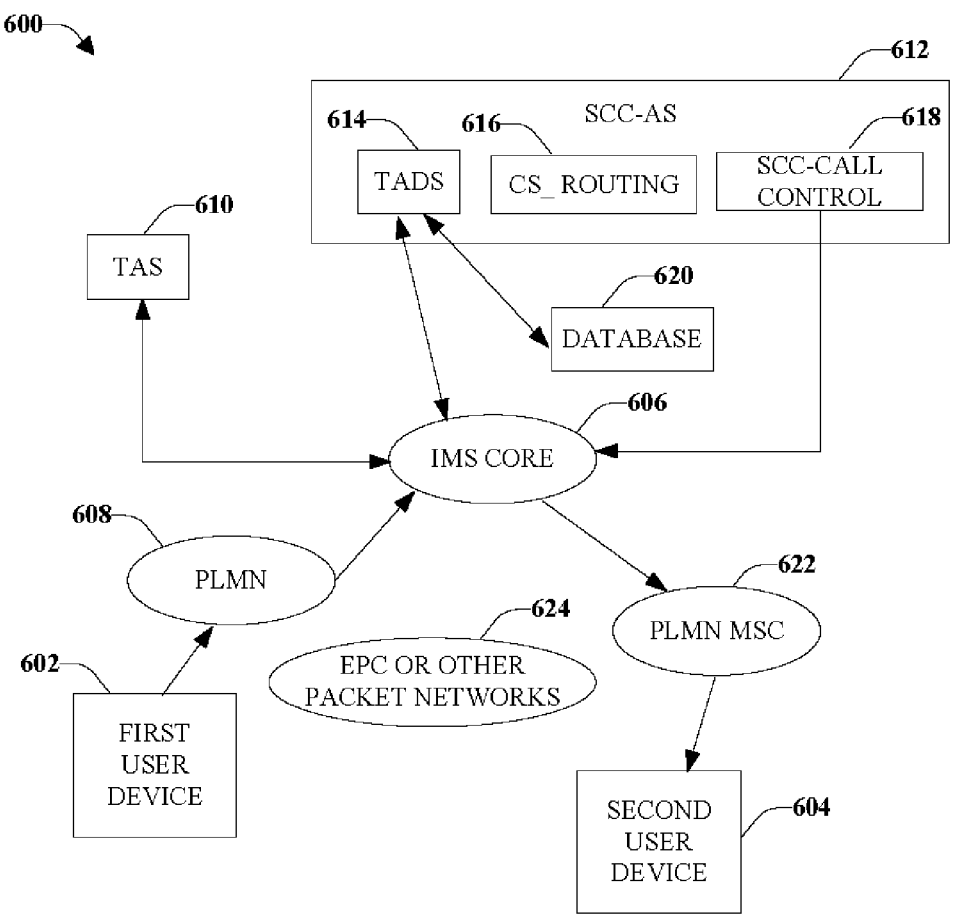
FIG. 6 illustrates a system for a traditional Long Term Evolution user device-termination call to a non-IMS-controlled domain.

FIG. 6 illustrates a system 600 for conventional Long Term Evolution device-termination call to a non-IMS-controlled domain. Similar to the call flow 500 of FIG. 5, call flow 600 includes a first user device 602 and a second user device 604. Second user device 604 can be located in a home network or a visited network. First user device 602 can be located in the home network, the visited network, or another network.

First user device 602 initiates a communication (e.g., call, voice call, data call, etc.) intended for second user device 604. The communication is routed from first user device 602 to an IMS Core 606 for terminating processing. The communication can be routed through a public land mobile network (PLMN 608) or other network. The IMS core 606 utilizes initial filter criteria (iFC) to determine that the first application server should be a Telephony Application Server (TAS 610). The TAS 610 applies terminating voice call features (e.g., Call Forwarding and so forth). After applying the terminating voice call features, the TAS 610 sends the communication back to the IMS Core 606.

When the call is to be routed to the second user device 604, the IMS core 606 utilizes iFC to invoke a Service Centralization and Continuity Application Server (SCC-AS 612) as the last application server. Included in the SCC-AS 612 are a Terminating Access Domain Selection (TADS 614), a Circuit-Switching Routing component (CS_routing 616) and a SCC-call control component (SCC-call control 618).

In this situation, the TADS 614 determines that second user device 604 is on the non-IMS-controlled circuit-switched network. Thus, SCC-AS 612 establishes a CS-leg (or path) for the communication in order to terminate the communication (at second user device 604). The communication is completed to the circuit-switched domain, such as through a PLMN MSC 622. Thus, various networks 624 (e.g., EPC or other packet networks) can be bypassed.

Although the communication can be routed to the non-IMS-controlled PLMN MSC 622, due to the lack of IMS signaling control to TAS 610, the voice mid-call features (e.g., 3-way calling and so forth) cannot be supported from IMS. Therefore, conventional systems (as defined in TS 23.292) have defined I1 and I2 reference points that may be used to attempt to solve this problem. However, the I1 implementation requires significant development on the handset (e.g., user device) and the I2 implementation requires significant investment in MSC-based technology.

For example, the I1 reference point is utilized between the second user device 604 and the SCC AS 612 for service control signaling over circuit-switching access. The I1 reference point supports set up through circuit-switching access for device-originating and device-terminating sessions, supports signaling for additional IMS parameter exchange during session setup, and supports IMS services control through circuit-switching access. The I2 reference point is utilized to route service control signaling between the MSC Server enhanced for ICS and the home IMS. The I1 and I2 reference points are further described in 3GPP TS 23.292, which provides definition of device-termination control flows to the user device on IMS-controlled network and non-IMS-controlled network.

Neither of the solutions (I1 or I2) is attractive given the evolving nature of the problem. For example, as an LTE network expands, there will be fewer circumstances in which user devices are on access networks that do not provide direct communication to the IMS domain. The I2 method would also impact a visited (serving) carrier's willingness to upgrade its MSCs.

The disclosed aspects can overcome these as well as other problems. The disclosed aspects can provide network operators with a low-cost alternative to the existing standards solutions (e.g., I1 and I2) through the bypass of IMS service control for calls that are delivered to the IMS when the device is on a non-IMS-controlled network. The disclosed aspects allow for a full set of standard mid-call features to be provided to the device user by the visited network. Further, the disclosed aspects can support both user devices that are roaming on non-LTE or non-IMS foreign networks and/or user devices that are connected to older-technology home networks. Further, the disclosed aspects can be utilized for both wireless and/or wireline applications.

Figure 7:
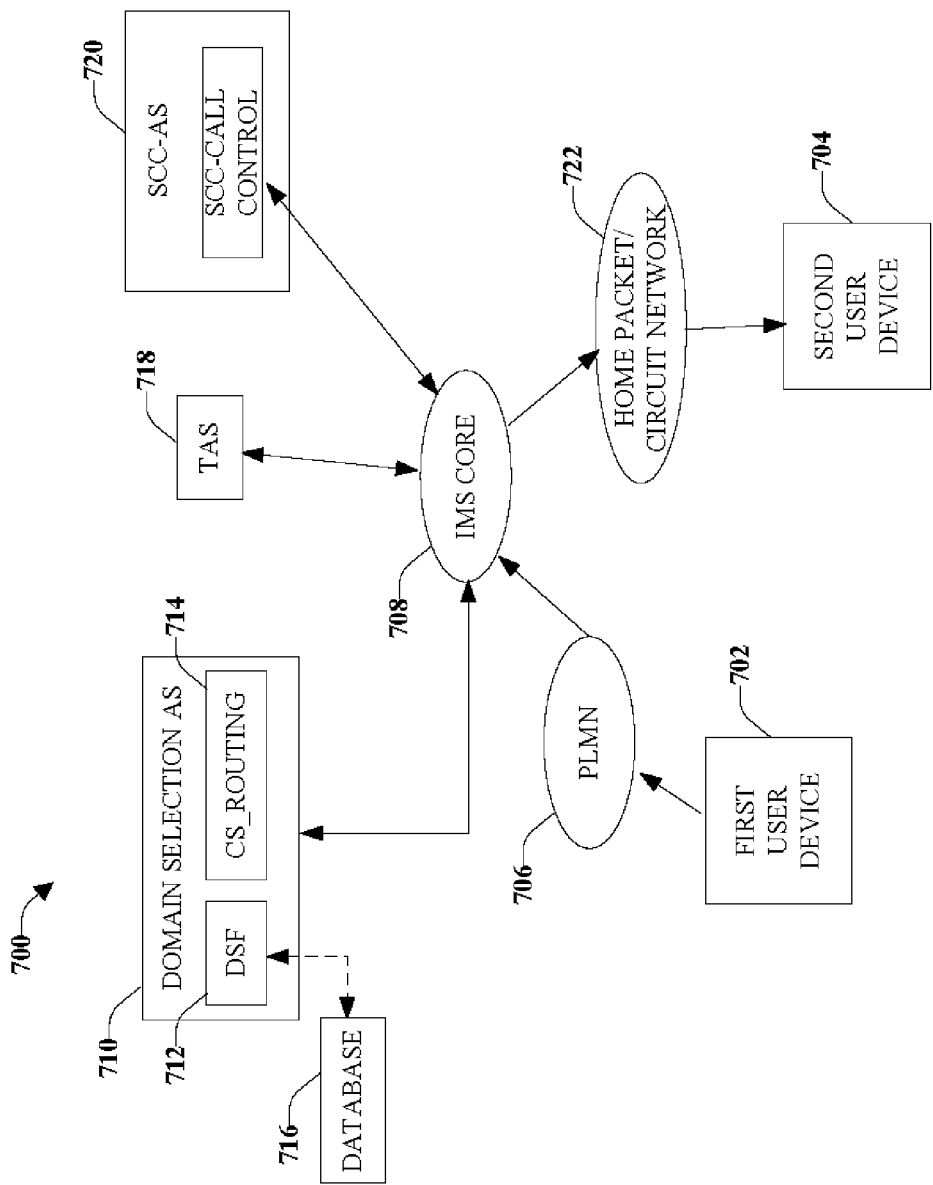
FIG. 7 illustrates a system for a Long Term Evolution user device-termination call to an IMS-controlled domain, according to an aspect.

FIG. 7 illustrates a system 700 for a LTE device-termination communication to an IMS-controlled domain, according to an aspect. Although the disclosed aspects can be utilized with any type of control domains, the system of FIGS. 7 and 8 will be discussed with reference to an IMS-controlled domain and a non-IMS-controlled domain for simplicity purposes. Included in system 700 are user devices, labeled as first user device 702 and second user device 704. Although two user devices are illustrated, system 700 can include any number of user devices. Second user device 704 can be associated with a home network and can be located in the home network or in a visited network when a communication is to be terminated (e.g., a communication originated by first user device 702 is connected to second user device 704). First user device 702 can originate the communication in home network, visited network, or another network, according to an aspect.

A communication (e.g., voice call, data call, video, and so forth) from first user device 702 is routed though PLMN 706 (or another network) to a node in the IMS core 708 for terminating processing, wherein call control is initiated. The communication is routed to a network entity, such as a Domain Selection AS 710 that includes a domain selection function (DSF 712) and a circuit-switching routing function (CS_routing 714). The DSF 712 is configured to determine a service domain to which the communication should be routed. DSF 712 is also configured to determine an access domain to which the communication should be routed.

The Domain Selection AS 710 is the first application server that is invoked during terminating processing. The Domain Selection AS 710 can reside in an IMS Application Server. In accordance with some aspects, the Domain Selection AS 710 resides on a standalone IMS Application Server. According to other aspects, the Domain Selection AS 710 can be added to an existing IMS Application Server that supports other call control functions.

The DSF 712 is configured to interface with a database 716 to obtain the access network information and to determine if IMS processing is needed for the communication. In accordance with some aspects, the database is a HSS. The interface between DSF 712 and database 716 can be based on a query that is sent by DSF 712 (or another component of DS-AS 710). Based on the query request, the database 716 determines if IMS processing is needed for the communication and returns the result of the query to DSF 712. The DSF 712 can also be provisioned with information to support domain selection determination. For example, a table of network providers that have a special relationship (e.g., a control relationship) with a home network can be accessible by DSF 712.

According to some aspects, the determination is made based on sending a query to a database and receiving service domain information and access domain information in response to the query. In accordance with some aspects, the determination is made based on obtaining information related to network (e.g., home network, visited network) where the user device is located and that network's access network capability (e.g., 2G, 3G, LTE, packet-switching capability), the user device's capability (e.g., supports ICS, does not support ICS), the user device's profile and/or configuration, DS-AS internal provisioned information (e.g., supported roaming partner, MSC information), or combinations thereof. In accordance with some aspects, the determination can be made in other manners.

If IMS processing is needed, the Domain Selection AS 710 routes the call back to the IMS Core 708. Domain Selection AS 710 can optionally drop off from the communication path. In this manner, Domain Selection AS 710 does not use any further resources on the communication.

The IMS Core 708 continues with IMS terminating processing and accesses a Telephony Application Server (TAS 718). After TAS 718, the call is routed back to the IMS Core 708, which accesses a SCC-AS 720 for SCC call anchor. After call anchoring, the SCC-AS 720 sends the call back to the IMS core 708. The IMS core 708 continues call control and routes the call to second user device 704 through home network 722, which can be a packet-switched network or a circuit switched network.

Figure 8:
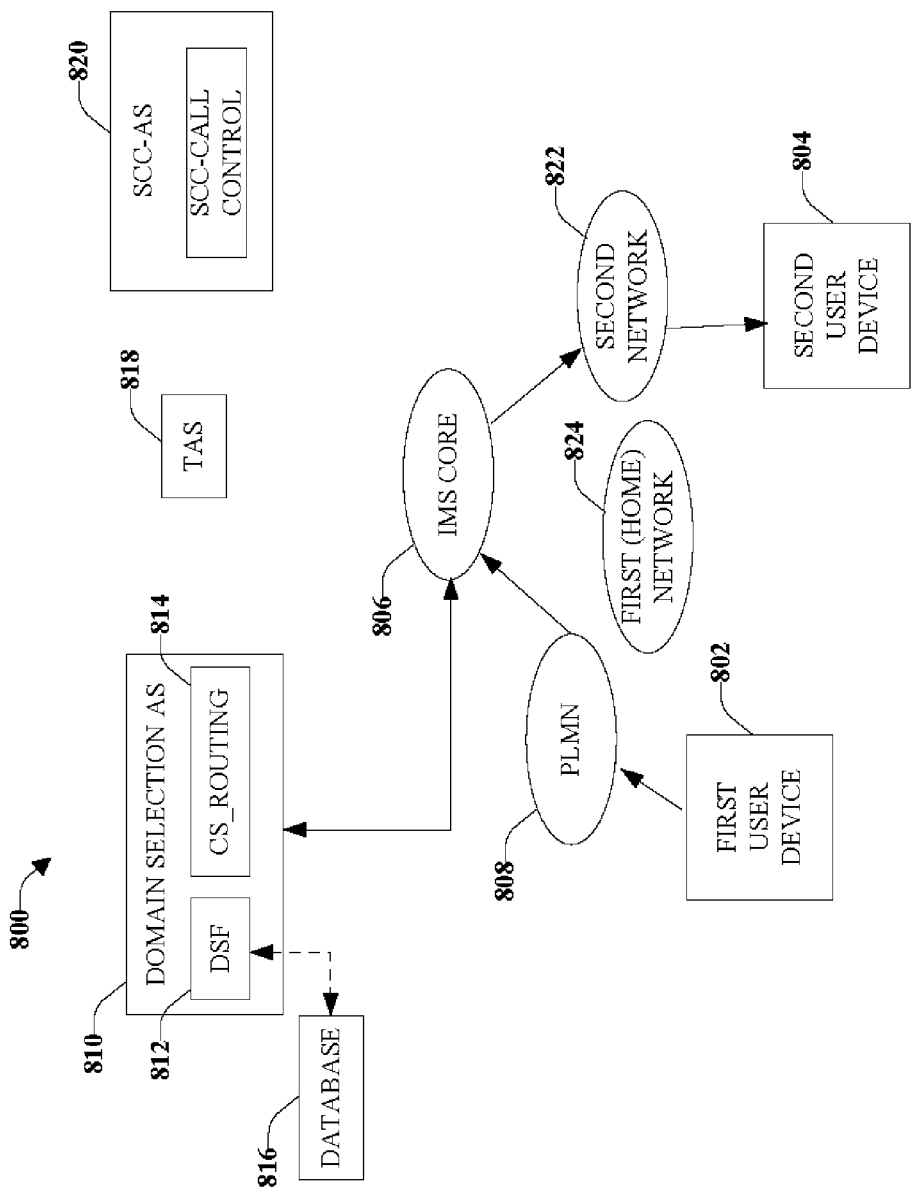
FIG. 8 illustrates a system for a Long Term Evolution user device-termination call to a non-IMS-controlled domain, according to an aspect.

FIG. 8 illustrates a system 800 for a Long Term Evolution device-termination call to a non-IMS-controlled domain, according to an aspect. System 800 is configured to bypass IMS call control when the user device is on (the communication is to terminate on) a non-IMS network (e.g., roaming).

System 800 comprises a first user device 802 (located in a home network (of second user device), a visited network, or another network) that sends a communication to a second user device 804. The communication is routed from first user device 802 to an IMS Core 806. In accordance with some aspects, the communication can be routed through a PLMN network 808 or another type of network.

The IMS Core 806 invokes a DS-AS 810 for terminating processing. The DS-AS 810 can reside in an IMS Application Server. In accordance with some aspects, the DS-AS 810 can reside on a standalone IMS Application Server. According to other aspects, the DS-AS 810 can be added to an existing IMS Application Server that supports other call control functions. The DS-AS 810 is configured to determine a domain that should be utilized to route the communication to second user device 804. DS-AS 810 comprises a DSF 812 and a CS routing function 814. The DSF 812 obtains information related to the second user device 804. In accordance with some aspects, the DSF 812 queries a database 816 and determines if IMS processing is needed. In an example, the database 816 is a HSS.

In this case, based on the database 816 query request and DSF 812 provisioned information, DSF 812 has determined that IMS processing (TAS 818 and SCC-AS 820) is not needed (e.g., call control should not be handled by the IMS-controlled domain). DS-AS 810 invokes CS-routing function 814 to determine how to route to second user device 804. In accordance with some aspects, CS-routing function 814 is configured to perform a SRI query to determine the visiting MSC routing number (MSRN) to which to route the communication. The DS-AS 810 routes the communication to the IMS Core 806 with the new CS number (MSRN). The IMS Core 806 suspends call control and routes the communication to the second network 822 and the second user device 804, which allows the communication to bypass the rest of IMS control in first (home) network and its access network 824.

Figure 9:
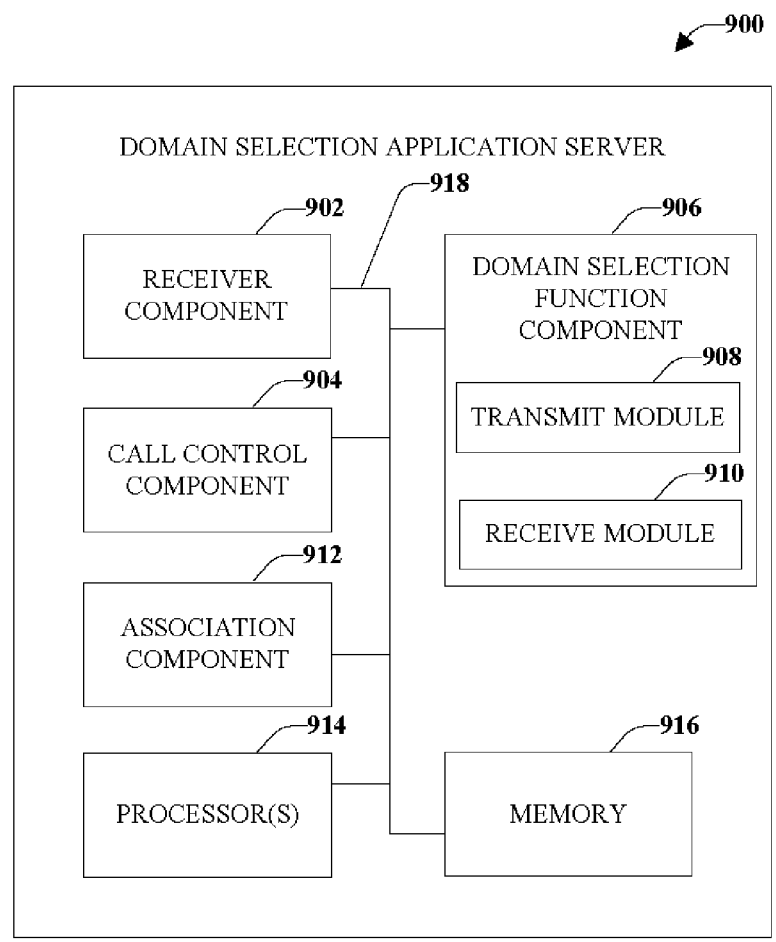
FIG. 9 illustrates a communication node configured to select a control domain for a device-terminated communication, according to an aspect.

FIG. 9 illustrates a communication node 900 configured to select a control domain for a device-terminated communication, according to an aspect. The communication node can be a home network that includes various entities including a Domain Selection Application Server (DS-AS). Included in communication node 900 is a receiver component 902 that is configured to receive a communication. The communication can be intended for a device that is associated with communication node 900 (e.g., home network) but currently is located (or registered) in a visited network. In accordance with some aspects, the terminating device is within the geographic region serviced by communication node 900. The communication can be originated in the home network, the visited network, or another network.

At about the same time as the communication is received a call control component 904 begins call control of the communication. If the terminating node is registered in a network not served by communication node, that network can also enable call control of the communication. Thus, there might be circumstances when conflicting call control exists.

Also included in communication node 900 is a domain selection function component 906 that performs domain selection for the communication. The domain selection is the first function in a communication path for the received communication. In accordance with some aspects, the domain selection function component 906 is a domain selection application server. According to some aspects, a selected control domain can be IMS-controlled or non-IMS-controlled.

In accordance with some aspects, domain selection function component 906 can include a transmit module 908 that is configured to send a query to a database and receives at a receive module 910 service domain information and access domain information in response to the query. According to some aspects, domain selection function component 906 determines network information of the visited network (if the terminating device is located in the visited network), and access network capability of the visited network, or combinations thereof. In an aspect, domain selection function component 906 ascertains at least one capability of a user device on which the communication is terminated. In accordance with another aspect, domain selection function component 906 utilizes its internal provisioned information to select the control domain. According to some aspects, domain selection function component 906 determines network information of the visited network, an access network capability of the visited network, a capability of a user device on which the communication is terminated, internal provisioned information, or combinations thereof.

According to some aspects, communication node 900 includes an association component 912 that is configured to establish whether the communication node 900 (e.g., home network) and the network on which the terminating device is currently located or registered (e.g., visited network) have a control relationship (if the terminating device is currently registered with communication node 900, association component 912 does not need to determine control relationship information). For example, association component 912 can ascertain whether home network and visited network can pass any type of sophisticated call control information back and forth. If the networks can pass the information, the networks have a control relationship. If the information cannot be passed between the networks, the networks do not have a control relationship. According to some aspects, association component 912 accesses a database to establish whether a control relationship exists. In accordance with some aspects, association component 912 ascertains that the home network is IMS controlled and the visited network is non-IMS controlled.

Based in part on a result of the domain selection performed by domain selection function component 906, the call control component 904 is configured to selectively disable call control. For example, the domain selection function component 906 can indicate that the home network (e.g., communication node 900) is to process the communication, thus, call control is continued by the home network. However, if the result of the domain selection function is that the communication should be handled by another domain (e.g., visited network), call control component 904 suspends the call control of the communication, which allows the communication to bypass communication node 900. In this case, the visited network performs the call control.

If call control is to be continued by communication node 900, domain selection function component 906 provides a result of the domain selection function to call control component 904. Domain selection function component 906 can also send session Internet Protocol messages to communication node 900, wherein the messages indicate that domain selection function component 906 should be removed from the communication path.

Communication node 900 also includes one or more processor(s) 914 configured to provide, or that provide, at least part of the described functionality of the various components within the communication nodes 900. Processor(s) 914 can execute computer-executable code instructions stored in memory 916 to provide the described functionality of communication node 900. Such computer-executable code instructions can include program modules, software application(s), or firmware application(s) that implement, for example, various aspects described herein. It should be appreciated that each of the one or more processor(s) 914 can be a centralized element or a distributed element. In distributed scenarios, the one or more processor(s) 914 can be part of the various components that comprise communication node 900. Memory 916 stores data, such as data structures, data objects, metadata, numerical variables and parameters, logical variables, or the like. In addition, processor(s) 914, memory 916, and the various components within communication node 900 can exchange data and signaling via bus 918. In an aspect, bus 918 can be embodied in one or more of a system bus, an address bus, a message bus, a memory bus, a power bus in accordance with various hardware, firmware, or software implementations.

Figure 10:
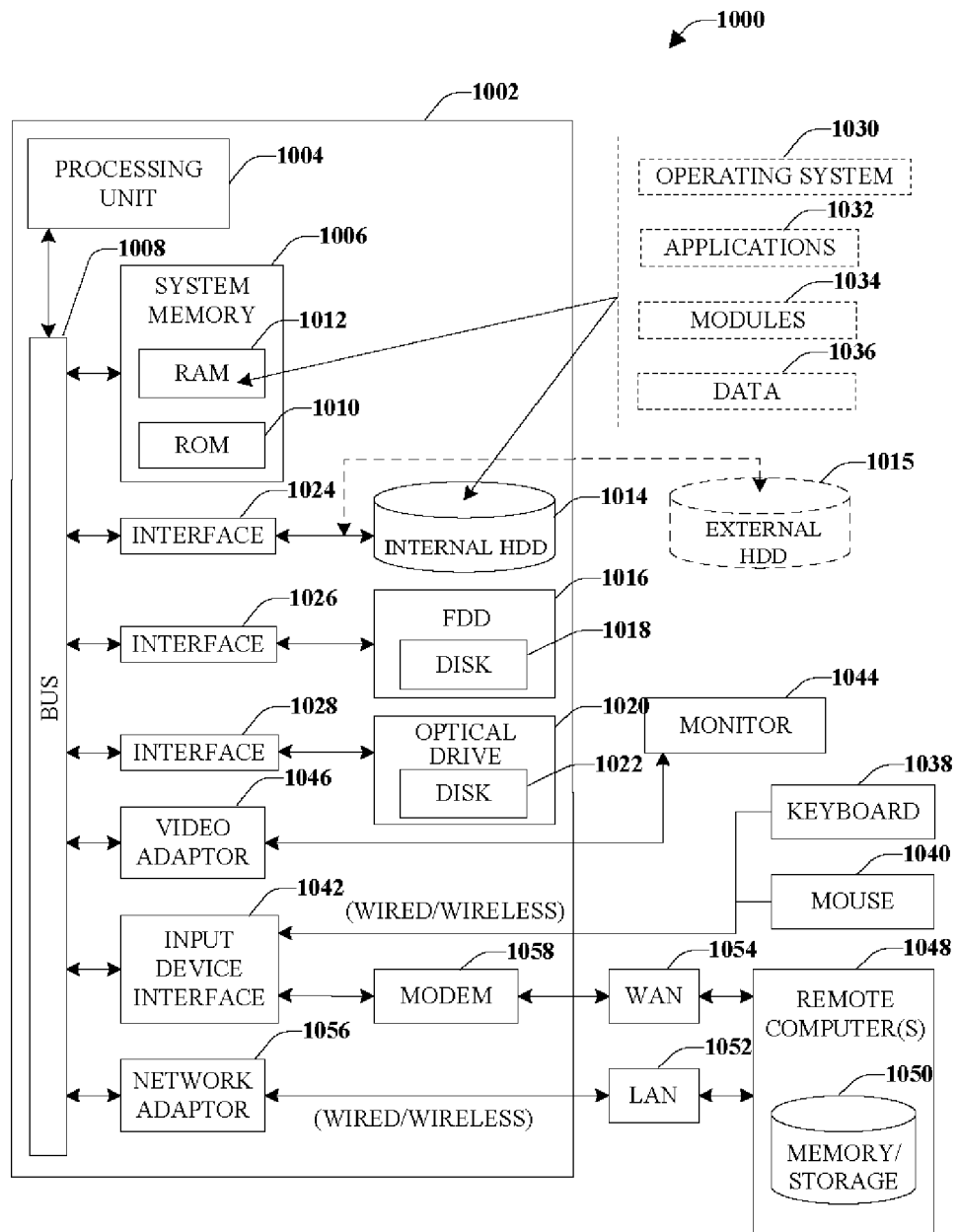
FIG. 10 illustrates an example computing environment in which the various aspects disclosed herein can be implemented.

In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that may run on one or more computers (or user devices), those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), or an external HDD 1015 can be present in addition to internal HDD 1014, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. In accordance with some aspects, a SS7/telecommunication signaling network can be utilized to interface with remote computer(s). The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 8 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
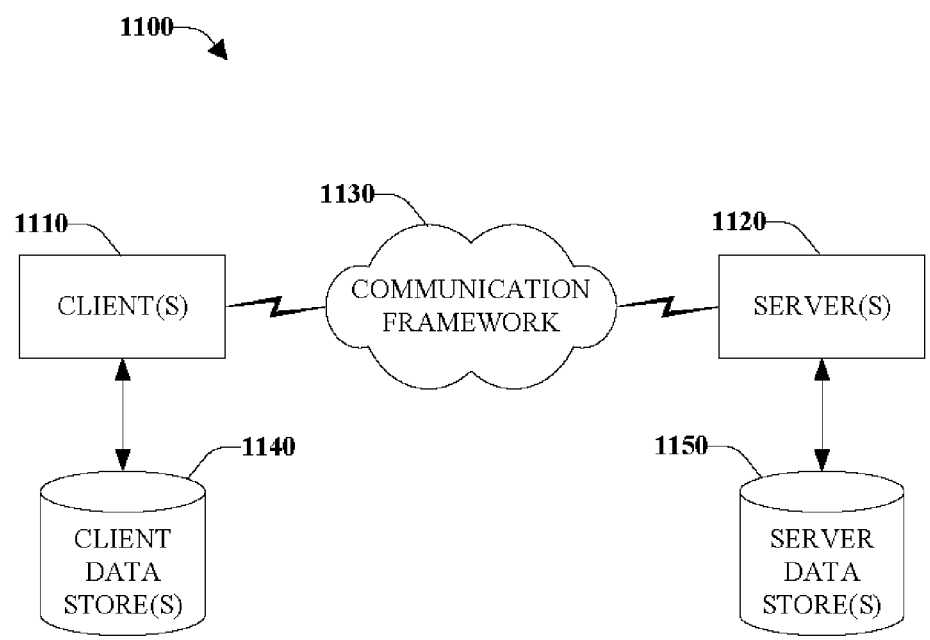
FIG. 11 illustrates a schematic block diagram of an example computing environment in accordance with aspects described herein.

FIG. 11 illustrates a schematic block diagram of an example computing environment 1130, in accordance with aspects described herein. The system 1100 includes one or more client(s) 1110. The client(s) 1110 can be hardware and/or software (e.g., threads, processes, computing devices). The system 1100 also includes one or more server(s) 1120. Thus, system 1100 can correspond to a two-tier client server model or a multi-tier model (e.g., client, middle tier server, data server), amongst other models. The server(s) 1120 can also be hardware and/or software (e.g., threads, processes, computing devices). The servers 1120 can house threads to perform transformations by employing the subject innovation, for example. One possible communication between a client 1110 and a server 1120 may be in the form of a data packet transmitted between two or more computer processes.

The system 1100 includes a communication framework 1130 that can be employed to facilitate communications between the client(s) 1110 and the server(s) 1120. The client (s) 1110 are operatively connected to one or more client data store(s) 1140 that can be employed to store information local to the client(s) 1110. Similarly, the server(s) 1120 are operatively connected to one or more server data store(s) 1150 that can be employed to store information local to the servers 1120.

It is to be noted that aspects, features, or advantages of the subject innovation described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and dire Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methods for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A method, comprising:
monitoring, by a system comprising a processor, a communication directed to a user device via a first network device of a set of first network devices of a first network, wherein the user device is coupled to a second network device of a set of second network devices of a second network;
enabling, by the system, call control of the communication to occur at the first network device; and
performing, by the system, a domain selection function based on a network registration condition of the user device and whether a call control relationship between the first network device and the second network device is determined to exist, wherein the call control relationship is determined to exist between the first network device and the second network device in response to a determination that control information has been communicated between the first network device and the second network device;
disabling, by the system, the call control at the first network device based on a result of the performing the domain selection function in response to an internet protocol multimedia subsystem call control being determined not to be available at the first network device and a determination that the first network device and the second network device do not have the control relationship;
sending, by the system, a query to a data store for information related to the second network device to which the user device is connected, wherein the query comprises an inquiry regarding whether the second network is an authorized roaming partner to the first network; and
receiving, by the system, service domain information and access domain information in response to the query;
wherein the first network is a home network and the second network is a visited network.

2. The method of claim 1, wherein the performing comprises:
determining the user device is registered with the set of second network devices of the second network.

3. The method of claim 1, wherein the disabling comprises allowing the communication path to bypass the call control at the first network device.

4. The method of claim 1, wherein the performing further comprises:
sending a query to a data store to determine, based on access network capability of the second network, whether a first type of communication protocol processing is to be provided for the communication; and
receiving service domain information of the user device and access domain information of the user device in response to the query.

5. The method of claim 1, wherein the performing further comprises determining network information of the second network device of the set of second network devices of the second network, and wherein the network information comprises a roaming partner relationship with the first network device.

6. The method of claim 1, further comprising:
obtaining, by the system, a location of the user device;
routing, by the system, the communication to the location to bypass a control domain of the first network device; and
disabling, by the system, the call control at the first network device.

7. The method of claim 1, further comprising:
removing, by the system, the first network device that performed the domain selection function, wherein the first network device is a domain selection application server device.

8. The method of claim 1, wherein the monitoring comprises receiving the communication originated by the set of first network devices of the first network, by the set of second network devices of the second network, or another set of network devices of another network.

9. The method of claim 1, wherein the performing comprises determining an access network capability of the second network device.

10. An apparatus of a home network, comprising:
a memory that stores executable instructions; and
a processor, coupled to the memory, that facilitates execution of the executable instructions to perform operations, comprising:
monitoring a communication directed to a user device;
selecting a domain for the communication comprising determining a control relationship between the apparatus and a terminating network device of a set of terminating network devices of a terminating network and an availability of an internet multimedia subsystem protocol at the apparatus, wherein the control relationship relates to a capability to communicate call control information between the apparatus and the terminating network device, and wherein a result of the selecting of the domain indicates whether the control of the communication is to be continued by the apparatus;
sending a request to a data store for information indicative of whether a first type of communication protocol processing is to be provided for the communication, wherein the determination is based on access network capability of the terminating network; and
disabling the control of the communication by the apparatus based on a determination that there is not the control relationship between the apparatus and the terminating network device;
sending a query to a data store for information related to the terminating network device to which the user device is connected, wherein the query comprises an inquiry regarding whether the terminating network is an authorized roaming partner to the home network; and
receiving service domain information and access domain information in response to the query;
wherein the terminating network is a visited network.

11. The apparatus of claim 10, wherein the operations further comprise determining the user device is registered with the terminating network device.

12. The apparatus of claim 11, wherein the operations further comprise:
transmitting session Internet protocol messages that indicate a domain selection function component is to be removed from a communication path for the communication.

13. A computer-readable storage device storing executable code instructions that, in response to execution, cause a system comprising a processor to perform operations, comprising:
enabling call control for a communication, wherein the communication is received at a home network device of a set of home network devices of a home network and is to be connected to a user device associated with a visited network device of a visited network;
performing a domain selection function as a first function represented in a communication path for the communication comprising determining a relationship between the home network device and the visited network device, wherein the relationship relates to a transfer of call control information; and
continuing the call control for the communication as a function of a result of the domain selection function based on a determination that the home network device and the visited network device have transferred the call control information between the home network device and the visited network device;
disabling the call control from the communication based on another determination that the home network device and the visited network device are not able to transfer the call control information;
sending a query to a data store for information related to the visited network device to which the user device is connected, wherein the query comprises an inquiry regarding whether the visited network is an authorized roaming partner to the home network; and
receiving service domain information and access domain information in response to the query.

14. The computer-readable storage device of claim 13, wherein the operations further comprise:
receiving the result of the domain selection function, wherein the result indicates the call control is to be performed by the home network device;
removing the domain selection function from the communication path.

15. The computer-readable storage device of claim 13, wherein the operations further comprise:
receiving the result of the domain selection function, wherein the result indicates the call control is to be performed by the visited network device.

* * * * *